DIGITAL CLOCK SYSTEM

Filed Nov. 6, 1961

INVENTORS
DOUGLAS A. VENN
DONALD H. JONES

BY Glenn S. Ovrevik Agent
Richard C. Steel
ATTORNEY

United States Patent Office 3,265,867
Patented August 9, 1966

3,265,867
DIGITAL CLOCK SYSTEM

Douglas A. Venn, Suitland, Md., and Donald H. Jones, Washington, D.C., assignors to the United States of America as represented by the Secretary of the Navy Filed Nov. 6, 1961, Ser. No. 150,604
4 Claims. (Cl. 235—92)

The invention described herein may be manufactured and used by or for the Government of the United States of America for governmental purposes without the payment of any royalties thereon or therefor.

This invention relates in general to time event control systems and in particular to such systems of the digital clock variety having high precision reliability.

Control of rapid, closely timed operational events presents a problem of increasing importance in many scientific fields. In space exploration and investigation, for example, timing is vitally important to navigational control of high velocity space vehicles. Frequently, continuous time information, such as elapsed time or time of day, is required for proper programming operation. Since time is a relative quantity it is essential to such systems, for purposes of synchronization, that a reference time base be employed. Often the reference time base is obtained from a recognized standard frequency source such as the U.S. Naval Radio Station NBA, Balboa, Canal Zone, which continuously broadcasts accurate time signals as determined by the U.S. Naval Observatory.

Generally, a standard frequency source at the remote location is synchronized with the output of Radio Station NBA, or the like, and the output of the synchronized source is converted into binary or digital information whereupon, it is compared with compatible binary or digital coded program information and equipment is actuated upon an attainment of a predetermined relationship between the two. It will be seen that the complexities involved in the conversion of the synchronized source information and the subsequent comparison of information are likely to introduce problems of reliability which affects performance to a varying degree in different applications, accordingly:

It is an object of this invention to provide an electronic counter circuitry with a high degree of inherent reliability.

It is another object of this invention to provide an electronic counter circuitry which affords prompt indication of a defective component.

It is still another object of this invention to provide an electronic counter circuitry which is self-correcting.

It is a further object of this invention to provide an electronic counter circuitry which substitutes an operating component for a defective component without loss of time information.

Other objects of the invention will become apparent upon a more comprehensive understanding of the invention for which reference is had to the following specification and drawings, wherein.

Figures 1, 2:
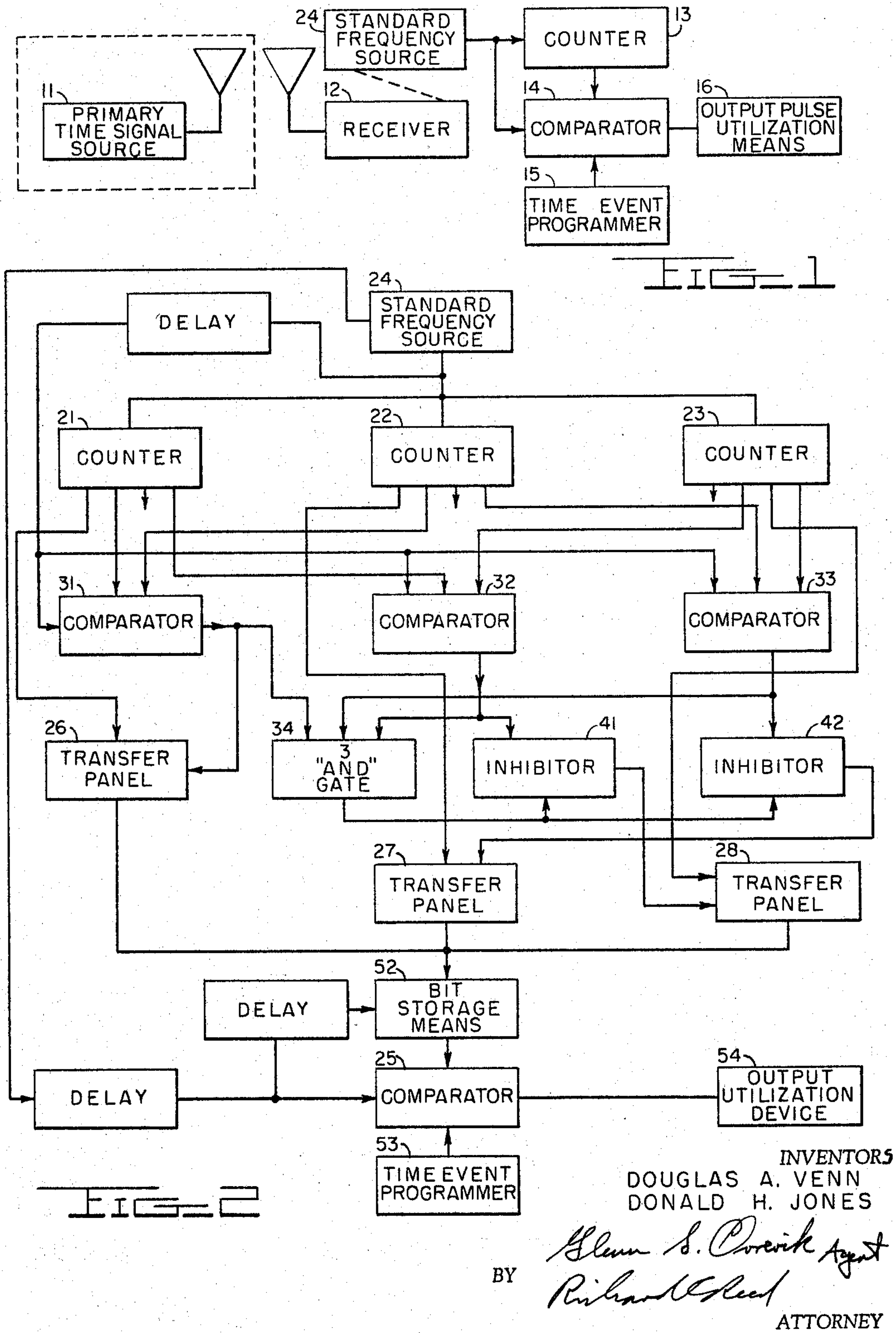
FIG. 1 is a block diagram of a typical time control system for use in remote applications.
FIG. 2 is a block diagram of one embodiment of the time event control system of this invention.

Briefly, the device of this invention is a digital clock system which utilizes a plurality of active and standby electronic counters, all of which are continuously operative and continuously monitored; a digital programmer; digital information comparison means and means for comparing the outputs of said counters and said programmer in said comparison means. Active counter selection is dependent upon the relationship of the outputs of the counters in said plurality thereof. The device of this invention provides for a rapid change in selection, if necessary, in the event a counter disability occurs and immediately issues a disability alert in order that prompt remedial action may be taken.

Referring now to the drawings:

In the system of FIG. 1, which is typical of the prior art, a reference time signal is transmitted by Primary Time Signal Source 11 at a selected frequency and is received by receiver 12. Standard frequency source 24, which is adapted for manual or automatic synchronization in accordance with the signal received by receiver 12, is connected to counter 13 and to comparator 14. Counter 13 converts input information into digital form and the output of the counter 13 is applied, along with the digital output of time event programmer 15, to the gating portion of comparator 14. Comparator 14 is adapted to pass the output of source 24 to output pulse utilization means 16 when the information content of the outputs of the counter 13 and the programmer 15 are in a selected relation, usually when they are electrically identical.

The embodiment of this invention shown in FIG. 2 accomplishes the same end as the prior art embodiment of FIG. 1 but does so with a greater degree of reliabiilty. In FIG. 2, a plurality of 3 counters 21, 22 and 23 is connected to an oscillator such as standard frequency source 24, which may be synchronized with the output of the primary time signal source by means not shown, such that each counts in accordance with the output of the source 24 to produce an output representative of information in the output of source 24. That is, in the case of twelve digit information, the counter is adapted to provide a forty-eight bit output in standard 1–2–4–8 form or the like.

The output of each of the counters of said plurality thereof is adapted for connection to principal comparator 25 by its respective transfer means 26, 27 and 28. Comparators 31, 32 and 33 are connected as shown such that each is adapted to compare the output of two counters of said plurality thereof. Comparators 31, 32 and 33 also are connected to source 24 such that when a selected comparison between counters occurs the output of source 24 can pass through the comparator. Generally, the comparators 31, 32 and 33 are adapted to pass the output of source 24 when the outputs of the three counters of the comparison in each case are identical. It is not essential, of course, that an identical comparison be attained and other relationships may be utilized to trigger the gating of comparators 31, 32 and 33, as desired.

Comparator 31 is shown connected to counters 21 and 22 to compare the output thereof and the output of comparator 31 is connected to transfer means 26 and to an input of "3 AND" gate 34 for purposes which will be explained hereinafter.

Comparator 32 is shown connected to counters 21 and 23 to compare the output thereof and the output of comparator 32 is connected to inhibitor gate 31 and to an input of "3 AND" gate 34. Likewise, comparator 33 is shown connected to counters 22 and 23 to compare the output thereof and the output of comparator 33 is connected to inhibitor gate 32 and to an input of "3 AND" gate 34.

"3 AND" gate 34 is connected to inhibitor gates 41 and 42 to block passage of the output of the comparators 32 and 33, respectively, when the outputs of comparators 31, 32 and 33 are in a selected relation, for example, identical. Inhibitors 41 and 42 are shown connected to transfer means 28 and 27, respectively, such that the outputs of comparators 32 and 33 are adapted to control the transfer means 28 and 27, respectively, and to pass the output of counters 23 and 22, respectively, on demand.

The output of each of the transfer means 26, 27 and 28 is connected to one input of comparator 25 via bit storage means 52 which, for example, might be a 48 bit device, if microsecond time of day resolution is desired.

As in the embodiment of FIG. 1, the output of a time event programmer 53 also is applied to the parallel type comparator 25 such that when the output of the time event programmer 53 and the output of the bit storage means 52 are in a selected relation, generally identical, the output of the source 24 which also is connected to the comparator 25 will pass therethrough to activate the output utilization means 54 or alter the operational state thereof.

It will be seen that in the device of this invention, any counter will be effectively disassociated immediately upon disablement of the counter and/or its respective circuitry, and that by continuous monitoring of the 3 AND gate inputs with a simple operative-inoperative warning system, a light system for example, a defective counter and/or comparator may be promptly located.

In addition, it will be seen that the device of this invention provides notable reliability advantages over the prior art in that it affords a substantially instantaneous, automatic changeover without loss of information upon breakdown of any one counter.

It will be seen, also, that the device may be adapted to include more than three counters, if greater reliability is desired and that in such adaptions, the additional counters may be connected in counting standby assembly with an accompanying increase in comparator and transfer means circuitry or in a non-counting standby arrangement with conventional means, not shown, for direct substitution of the noncounting standby unit in place of the defective unit after changeover. It will be appreciated that the invention disclosed herein comprises an assembly of electronic stages of various types readily available and in common usage in the art. More particularly, it will be appreciated that electronic stages of the static semiconductor variety are available and may be employed in the device of this invention, exclusively if desired, to obtain the numerous advantages of size, weight, reliability, etc., inherent in their usage.

It is understood, of course, that it is within the purview of this disclosure to alter the exemplary embodiment depicted in the drawings in accordance with present day practice in the art and that this invention is to be limited only by the scope of the claims appended hereto.

Obviously many modifications and variations of the present invention are possible in the light of the above teachings. It is therefore to be understood that within the scope of the appended claims the invention may be practiced otherwise than as specifically described.

What is calimed is:

1. A digital clock system comprising
a time information source;
a plurality of bit counters, each of said bit counters connected to said source to count the output thereof;
a plurality of first gating means, each of said first gating means connected to said source and to the outputs of two bit counters in said plurality thereof, and each of said first gating means adapted to pass the output of said source when the outputs of its respective bit counters are in a first selected relation;

second gating means of the "AND" variety; means connecting each of the outputs of said first gating means to said second gating means; said second gating means adapted to respond to input signal deviations from a second selected relation;
signal comparator means,
a plurality of signal transfer means interconnecting a first input of said signal comparator means and respective bit counters in said plurality thereof, each of said signal transfer means including gating means for signal interruption control;
means connecting the output of one of said first gating means in said plurality thereof to the signal interruption control gating means of one of said signal transfer means in said plurality thereof such that in the presence of an output signal from said one of said first gating means said one of said signal transfer means is operative;
means connecting the output of said second gating means to the signal interruption control gating means of the remainder of said signal transfer means in said plurality thereof such that said remainder of said transfer means are interrupted when the outputs of said first gating means are in said second selected relation;
coded bit programmer means;
means connecting the output of said bit programmer means to a second input of said signal comparison means such that said signal comparison means is operative when the signals applied to said first and second inputs thereof are in a third selected relation;
and means for utilizing the output of said pulse signal comparator.

2. The digital clock as defined in claim 1 wherein means are provided for connecting said time information source to said signal comparator means and said signal comparison means is operative to pass the output of said source when the signals applied to said first and second inputs thereof are in said third selected relation.

3. The digital clock system as defined in claim 1 wherein each of said first gating means are adapted to pass the output of said source when the outputs of its respective bit counters are identical.

4. The digital clock system as defined in claim 1 wherein each of said first gating means are adapted to pass the output of said source when the outputs of its respective bit counters are identical and occur simultaneously.

References Cited by the Examiner

UNITED STATES PATENTS 3,017,610 1/1962 Auerbach et al. ---- 340—146.2 X

MAYNARD R. WILBUR, *Primary Examiner.*

WALTER W. BURNS, *Examiner.*

M. P. ALLEN, J. MILLER, *Assistant Examiners.*